(12) United States Patent
Roo

(10) Patent No.: US 7,433,665 B1
(45) Date of Patent: Oct. 7, 2008

(54) APPARATUS AND METHOD FOR CONVERTING SINGLE-ENDED SIGNALS TO A DIFFERENTIAL SIGNAL, AND TRANSCEIVER EMPLOYING SAME

(75) Inventor: Pierte Roo, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 1378 days.

(21) Appl. No.: 09/920,241

(22) Filed: Aug. 1, 2001

Related U.S. Application Data

(63) Continuation-in-part of application No. 09/629,092, filed on Jul. 31, 2000, now Pat. No. 6,775,529.

(51) Int. Cl.
*H04B 1/10* (2006.01)
*H04B 3/20* (2006.01)
*H04B 1/38* (2006.01)

(52) U.S. Cl. ............................... 455/296 DC; 455/295; 455/278.1; 455/63.1; 455/67.13; 455/570; 370/286; 370/289

(58) Field of Classification Search ................. 455/296, 455/295, 278.1, 63.1, 67.13, 570, 78, 326; 370/286, 289
See application file for complete search history.

(56) References Cited

U.S. PATENT DOCUMENTS

| | | | |
|---|---|---|---|
| 3,297,951 A | 1/1967 | Blasbalg | |
| 3,500,215 A | 3/1970 | Leuthold et al. | |
| 3,521,170 A | 7/1970 | Leuthold et al. | |
| 3,543,009 A | 11/1970 | Voelcher, Jr. | |
| 3,793,588 A | 2/1974 | Gerwen et al. | 375/296 |
| 3,793,589 A | 2/1974 | Puckette | |
| 3,973,089 A | 8/1976 | Puckette | |
| 4,071,842 A | 1/1978 | Tewksbury | |
| 4,112,253 A | 9/1978 | Wilhelm | 178/58 R |
| 4,131,767 A | 12/1978 | Weinstein | |
| 4,152,541 A | 5/1979 | Yuen | 178/59 |
| RE30,111 E | 10/1979 | Blood, Jr. | 178/58 R |
| 4,309,673 A | 1/1982 | Norberg et al. | |

(Continued)

FOREIGN PATENT DOCUMENTS

DE  10 2004 017 497  11/2004

(Continued)

OTHER PUBLICATIONS

Sedra, et al., Microelectronic Circuits, 3rd Edition, 1991.

(Continued)

*Primary Examiner*—Matthew Anderson
*Assistant Examiner*—Eugene Yun

(57) ABSTRACT

A communication circuit for an Ethernet or other network transceiver includes a first sub-circuit having a first input which receives a composite differential signal including first and second differential signal components, a second input which receives a differential replica transmission signal, and an output which provides a differential receive signal which comprises the composite differential signal minus the differential replica transmission signal. The communication circuit also includes a second sub-circuit which produces first and second single-ended replica transmission signals which together substantially comprise a replica of the first differential signal component of the composite differential signal and a third sub-circuit, which is coupled to the first and second sub-circuits, and which produces the differential replica transmission signal from the first and second single-ended replica transmission signals.

72 Claims, 2 Drawing Sheets

U.S. PATENT DOCUMENTS

| | | | |
|---|---|---|---|
| 4,321,753 A | 3/1982 | Fusari | |
| 4,362,909 A | 12/1982 | Snijders et al. | |
| 4,393,370 A | 7/1983 | Hareyama | |
| 4,393,494 A | 7/1983 | Belforte et al. | 370/27 |
| 4,408,190 A | 10/1983 | Nagano | |
| 4,464,545 A | 8/1984 | Werner | |
| 4,503,421 A | 3/1985 | Hareyama et al. | |
| 4,527,126 A | 7/1985 | Petrich et al. | |
| 4,535,206 A | 8/1985 | Falconer | |
| 4,591,832 A | 5/1986 | Fling et al. | |
| 4,605,826 A | 8/1986 | Kanemasa | |
| 4,621,172 A | 11/1986 | Kanemasa et al. | |
| 4,621,356 A | 11/1986 | Scipione | |
| 4,626,803 A | 12/1986 | Holm | |
| 4,715,064 A | 12/1987 | Claessen | |
| 4,727,566 A | 2/1988 | Dahlqvist | |
| 4,746,903 A | 5/1988 | Czarniak et al. | |
| 4,816,830 A | 3/1989 | Cooper | |
| 4,817,081 A | 3/1989 | Wouda et al. | |
| 4,868,571 A | 9/1989 | Inamasu | |
| 4,878,244 A | 10/1989 | Gawargy | |
| 4,888,762 A | 12/1989 | Arai | |
| 4,894,820 A | 1/1990 | Miyamoto | |
| 4,935,919 A | 6/1990 | Hiraguchi | |
| 4,947,171 A | 8/1990 | Pfiefer et al. | |
| 4,970,715 A | 11/1990 | McMahan | |
| 4,972,360 A | 11/1990 | Cukier et al. | |
| 4,988,960 A | 1/1991 | Tomisawa | |
| 4,993,045 A | 2/1991 | Alfonso | |
| 4,999,830 A | 3/1991 | Agazzi | |
| 5,018,134 A | 5/1991 | Kokubo et al. | |
| 5,043,730 A | 8/1991 | Obinnata | |
| 5,084,865 A | 1/1992 | Koike | |
| 5,119,365 A | 6/1992 | Warner et al. | |
| 5,136,260 A | 8/1992 | Yousefi-Elezei | |
| 5,148,427 A | 9/1992 | Buttle et al. | |
| 5,153,450 A | 10/1992 | Ruetz | |
| 5,164,725 A | 11/1992 | Long | |
| 5,175,764 A | 12/1992 | Patel et al. | |
| 5,185,538 A | 2/1993 | Kondoh et al. | |
| 5,202,528 A | 4/1993 | Iwaooji | |
| 5,204,880 A | 4/1993 | Wurster et al. | |
| 5,212,659 A | 5/1993 | Scott et al. | |
| 5,222,084 A | 6/1993 | Takahashi | |
| 5,243,346 A | 9/1993 | Inami | |
| 5,243,347 A | 9/1993 | Jackson et al. | |
| 5,245,231 A | 9/1993 | Kocis et al. | |
| 5,245,654 A | 9/1993 | Wilkison et al. | |
| 5,248,956 A | 9/1993 | Himes | |
| 5,253,249 A | 10/1993 | Fitzgerald et al. | |
| 5,253,272 A | 10/1993 | Jaeger et al. | |
| 5,254,994 A | 10/1993 | Takakura et al. | |
| 5,267,269 A | 11/1993 | Shih et al. | |
| 5,269,313 A | 12/1993 | DePinto | |
| 5,272,453 A | 12/1993 | Traynor et al. | |
| 5,280,526 A | 1/1994 | Laturell | |
| 5,282,157 A | 1/1994 | Murphy et al. | |
| 5,283,582 A | 2/1994 | Krenik | |
| 5,305,379 A | 4/1994 | Takeuchi | |
| 5,307,064 A | 4/1994 | Kudoh | |
| 5,307,405 A | 4/1994 | Sih | 379/410 |
| 5,323,157 A | 6/1994 | Ledzius et al. | |
| 5,325,400 A | 6/1994 | Co et al. | |
| 5,357,145 A | 10/1994 | Segaram | |
| 5,365,935 A | 11/1994 | Righter et al. | |
| 5,367,540 A | 11/1994 | Kakuishi et al. | |
| 5,373,147 A | 12/1994 | Awata et al. | |
| 5,375,147 A | 12/1994 | Awata et al. | |
| 5,388,092 A | 2/1995 | Koyama et al. | 370/32.1 |
| 5,388,123 A | 2/1995 | Uesugi et al. | |
| 5,392,042 A | 2/1995 | Pellon | |
| 5,399,996 A | 3/1995 | Yates et al. | |
| 5,418,478 A | 5/1995 | Van Brunt et al. | |
| 5,440,514 A | 8/1995 | Flannagan et al. | |
| 5,440,515 A | 8/1995 | Chang et al. | |
| 5,444,739 A | 8/1995 | Uesugi et al. | |
| 5,465,272 A | 11/1995 | Smith | |
| 5,471,665 A | 11/1995 | Pace et al. | |
| 5,479,124 A | 12/1995 | Pun et al. | |
| 5,489,873 A | 2/1996 | Kamata et al. | |
| 5,507,036 A | 4/1996 | Vagher | |
| 5,508,656 A | 4/1996 | Jaffard et al. | |
| 5,517,141 A | 5/1996 | Abdi et al. | |
| 5,517,435 A | 5/1996 | Sugiyama | 364/724.19 |
| 5,521,540 A | 5/1996 | Marbot | |
| 5,537,113 A | 7/1996 | Kawabata | |
| 5,539,403 A | 7/1996 | Tani et al. | |
| 5,539,405 A | 7/1996 | Norsworthy | |
| 5,539,773 A | 7/1996 | Knee et al. | 375/232 |
| 5,559,476 A | 9/1996 | Zhang et al. | |
| 5,568,064 A | 10/1996 | Beers et al. | |
| 5,568,142 A | 10/1996 | Velazquez et al. | |
| 5,572,158 A | 11/1996 | Lee et al. | |
| 5,572,159 A | 11/1996 | McFarland | |
| 5,577,027 A | 11/1996 | Cheng | |
| 5,579,004 A | 11/1996 | Linz | |
| 5,585,795 A | 12/1996 | Yuasa et al. | |
| 5,585,802 A | 12/1996 | Cabler et al. | |
| 5,587,681 A | 12/1996 | Fobbester | |
| 5,589,788 A | 12/1996 | Goto | |
| 5,596,439 A * | 1/1997 | Dankberg et al. | 398/35 |
| 5,600,321 A | 2/1997 | Winen | |
| 5,613,233 A | 3/1997 | Vagher | |
| 5,625,357 A | 4/1997 | Cabler | |
| 5,629,652 A | 5/1997 | Weiss | |
| 5,648,738 A | 7/1997 | Welland et al. | |
| 5,651,029 A | 7/1997 | Yang et al. | |
| 5,659,609 A | 8/1997 | Koizumi et al. | 370/410 |
| 5,663,728 A | 9/1997 | Essenwanger | |
| 5,666,354 A | 9/1997 | Cecchi et al. | 370/284 |
| 5,684,482 A | 11/1997 | Galton | |
| 5,687,330 A | 11/1997 | Gist et al. | |
| 5,696,796 A | 12/1997 | Poklemba | |
| 5,703,541 A | 12/1997 | Nakashima | |
| 5,719,515 A | 2/1998 | Danger | |
| 5,726,583 A | 3/1998 | Kaplinsky | |
| 5,745,564 A | 4/1998 | Meek | |
| 5,757,219 A | 5/1998 | Weedon et al. | |
| 5,757,298 A | 5/1998 | Manley et al. | |
| 5,760,726 A | 6/1998 | Koifman et al. | |
| 5,790,060 A | 8/1998 | Tesche | |
| 5,790,658 A | 8/1998 | Yip et al. | |
| 5,796,725 A | 8/1998 | Muraoka | 370/290 |
| 5,798,661 A | 8/1998 | Runaldue et al. | |
| 5,798,664 A | 8/1998 | Nagahori et al. | |
| 5,812,597 A | 9/1998 | Graham et al. | |
| 5,821,892 A | 10/1998 | Smith | |
| 5,822,426 A | 10/1998 | Rasmus et al. | 379/402 |
| 5,825,819 A | 10/1998 | Cogburn | 375/257 |
| 5,834,860 A | 11/1998 | Parsons et al. | |
| 5,838,177 A | 11/1998 | Keeth | |
| 5,838,186 A | 11/1998 | Inoue et al. | |
| 5,841,386 A | 11/1998 | Leduc | |
| 5,841,809 A | 11/1998 | Koizumi et al. | |
| 5,844,439 A | 12/1998 | Zortea | |
| 5,859,552 A | 1/1999 | Do et al. | |
| 5,864,587 A | 1/1999 | Hunt | 375/316 |
| 5,878,340 A | 3/1999 | Asaoka et al. | |
| 5,880,615 A | 3/1999 | Bazes | |
| 5,887,059 A | 3/1999 | Xie et al. | |
| 5,892,701 A | 4/1999 | Huang et al. | 708/819 |
| 5,894,496 A | 4/1999 | Jones | |
| 5,898,340 A * | 4/1999 | Chatterjee et al. | 330/251 |
| 5,930,686 A | 7/1999 | Devlin et al. | |

| | | | | | | |
|---|---|---|---|---|---|---|
| 5,936,450 | A | 8/1999 | Unger | 6,370,190 | B1 | 4/2002 | Young et al. |
| 5,940,442 | A | 8/1999 | Wong et al. | 6,373,417 | B1 | 4/2002 | Melanson |
| 5,940,498 | A | 8/1999 | Bardl | 6,373,908 | B2 | 4/2002 | Chan |
| 5,949,362 | A | 9/1999 | Tesch et al. | 6,377,640 | B2 | 4/2002 | Trans |
| 5,963,069 | A | 10/1999 | Jefferson et al. | 6,377,683 | B1 | 4/2002 | Dobson et al. |
| 5,982,317 | A | 11/1999 | Steensgaard-Madsen | 6,385,238 | B1 | 5/2002 | Nguyen et al. |
| 5,999,044 | A | 12/1999 | Wohlfarth et al. | 6,385,442 | B1 | 5/2002 | Vu et al. |
| 6,005,370 | A | 12/1999 | Gustavson | 6,389,077 | B1 | 5/2002 | Chan |
| 6,014,048 | A | 1/2000 | Talaga et al. | 6,408,032 | B1 | 6/2002 | Lye et al. |
| 6,037,812 | A | 3/2000 | Gaudet | 6,411,647 | B1 | 6/2002 | Chan |
| 6,038,266 | A | 3/2000 | Lee et al. | 6,415,003 | B1 | 7/2002 | Raghavan |
| 6,043,766 | A | 3/2000 | Hee et al. | 6,421,377 | B1 | 7/2002 | Langberg et al. |
| 6,044,489 | A | 3/2000 | Hee et al. | 6,421,534 | B1 | 7/2002 | Cook et al. |
| 6,046,607 | A | 4/2000 | Kohdaka | 6,433,608 | B1 | 8/2002 | Huang |
| 6,047,346 | A | 4/2000 | Lau et al. | 6,441,761 | B1 | 8/2002 | Viswanathan |
| 6,049,706 | A | 4/2000 | Cook et al. | 6,452,428 | B1 | 9/2002 | Mooney et al. |
| 6,052,076 | A | 4/2000 | Patton, III et al. | 6,462,688 | B1 | 10/2002 | Sutardja |
| 6,057,716 | A | 5/2000 | Dinteman et al. | 6,469,988 | B1 | 10/2002 | Yang et al. ................ 370/289 |
| 6,067,327 | A | 5/2000 | Creigh et al. | 6,476,476 | B1 | 11/2002 | Viswanathan |
| 6,087,968 | A | 7/2000 | Roza | 6,476,746 | B2 | 11/2002 | Viswanathan |
| 6,094,082 | A | 7/2000 | Gaudet | 6,476,749 | B1 | 11/2002 | Yeap et al. |
| 6,100,830 | A | 8/2000 | Dedic | 6,477,200 | B1 | 11/2002 | Agazzi et al. |
| 6,121,831 | A | 9/2000 | Mack | 6,492,922 | B1 | 12/2002 | New |
| 6,137,328 | A | 10/2000 | Sung | 6,501,402 | B2 | 12/2002 | Boxho |
| 6,140,857 | A | 10/2000 | Bazes | 6,509,854 | B1 | 1/2003 | Morita et al. |
| 6,148,025 | A | 11/2000 | Shirani et al. | 6,509,857 | B1 | 1/2003 | Nakao |
| 6,150,856 | A | 11/2000 | Morzano | 6,531,973 | B2 | 3/2003 | Brooks et al. |
| 6,154,784 | A | 11/2000 | Liu | 6,535,987 | B1 | 3/2003 | Ferrant |
| 6,163,283 | A | 12/2000 | Schofield | 6,539,072 | B1 | 3/2003 | Donnelly et al. |
| 6,163,289 | A | 12/2000 | Ginetti | 6,556,677 | B1* | 4/2003 | Hardy ................ 379/406.01 |
| 6,163,579 | A | 12/2000 | Harrington et al. | 6,563,870 | B1 | 5/2003 | Schenk |
| 6,166,572 | A | 12/2000 | Yamaoka | 6,570,931 | B1 | 5/2003 | Song |
| 6,172,634 | B1 | 1/2001 | Leonowich et al. | 6,576,746 | B2 | 6/2003 | McBride et al. |
| 6,173,019 | B1 | 1/2001 | Hee et al. | 6,577,114 | B1 | 6/2003 | Roo |
| 6,177,896 | B1 | 1/2001 | Min | 6,583,742 | B1 | 6/2003 | Hossak |
| 6,185,263 | B1 | 2/2001 | Chan | 6,594,304 | B2 | 7/2003 | Chan |
| 6,188,282 | B1 | 2/2001 | Montalvo | 6,606,489 | B2* | 8/2003 | Razavi et al. ............. 455/323 |
| 6,191,719 | B1 | 2/2001 | Bult et al. | 6,608,743 | B1 | 8/2003 | Suzuki |
| 6,192,226 | B1 | 2/2001 | Fang | 6,633,178 | B2 | 10/2003 | Wilcox et al. |
| 6,201,490 | B1 | 3/2001 | Kawano et al. | 6,687,286 | B1 | 2/2004 | Leonowich et al. |
| 6,201,831 | B1 | 3/2001 | Agazzi et al. | 6,690,742 | B2 | 2/2004 | Chan |
| 6,201,841 | B1 | 3/2001 | Iwamatsu et al. | 6,714,825 | B1 | 3/2004 | Tanaka |
| 6,204,788 | B1 | 3/2001 | Tani | 6,721,379 | B1 | 4/2004 | Cranford, Jr. et al. |
| 6,211,716 | B1 | 4/2001 | Nguyen et al. | 6,731,748 | B1 | 5/2004 | Edgar et al. |
| 6,215,429 | B1 | 4/2001 | Fischer et al. | 6,744,831 | B2 | 6/2004 | Chan |
| 6,223,061 | B1 | 4/2001 | Dacus et al. | 6,744,931 | B2 | 6/2004 | Komiya et al. |
| 6,236,345 | B1 | 5/2001 | Dagnachew et al. | 6,751,202 | B1 | 6/2004 | Henrie |
| 6,236,346 | B1 | 5/2001 | Schofield | 6,765,931 | B1 | 7/2004 | Rabenko et al. |
| 6,236,645 | B1 | 5/2001 | Agazzi | 6,775,529 | B1 | 8/2004 | Roo |
| 6,249,164 | B1 | 6/2001 | Cranford, Jr. et al. | 6,816,097 | B2 | 11/2004 | Brooks et al. |
| 6,249,249 | B1 | 6/2001 | Obayashi et al. | 6,823,028 | B1 | 11/2004 | Phanse |
| 6,259,680 | B1 | 7/2001 | Blackwell et al. | 6,844,837 | B1 | 1/2005 | Sutardja et al. |
| 6,259,745 | B1 | 7/2001 | Chan | 6,864,726 | B2 | 3/2005 | Levin et al. |
| 6,259,957 | B1 | 7/2001 | Alexander et al. | 6,882,216 | B2 | 4/2005 | Kang |
| 6,266,367 | B1 | 7/2001 | Strait | 6,980,644 | B1 | 12/2005 | Sallaway et al. |
| 6,271,782 | B1 | 8/2001 | Steensgaard-Madsen | 2001/0050585 | A1 | 12/2001 | Carr |
| 6,275,098 | B1 | 8/2001 | Uehara et al. | 2002/0009057 | A1 | 1/2002 | Blackwell et al. |
| 6,288,592 | B1 | 9/2001 | Gupta ....................... 327/392 | 2002/0061087 | A1 | 5/2002 | Williams |
| 6,288,604 | B1 | 9/2001 | Shih et al. | 2002/0084857 | A1 | 7/2002 | Kim |
| 6,289,068 | B1 | 9/2001 | Hassoun et al. | 2002/0136321 | A1 | 9/2002 | Chan |
| 6,295,012 | B1 | 9/2001 | Greig | 2002/0181601 | A1 | 12/2002 | Huang et al. |
| 6,298,046 | B1 | 10/2001 | Thiele | 2003/0002570 | A1 | 1/2003 | Chan |
| 6,307,490 | B1 | 10/2001 | Litfin et al. | 2003/0174660 | A1 | 9/2003 | Blon et al. |
| 6,309,077 | B1 | 10/2001 | Saif et al. | 2004/0005015 | A1 | 1/2004 | Chan |
| 6,313,775 | B1 | 11/2001 | Lindfors et al. | 2004/0090981 | A1 | 5/2004 | Lin et al. |
| 6,332,004 | B1 | 12/2001 | Chang | 2004/0091071 | A1 | 5/2004 | Lin et al. |
| 6,333,959 | B1 | 12/2001 | Lai et al. | 2004/0105504 | A1 | 6/2004 | Chan |
| 6,339,390 | B1 | 1/2002 | Velazquez et al. | 2004/0141569 | A1 | 7/2004 | Agazzi |
| 6,340,940 | B1 | 1/2002 | Melanson | | | | |
| 6,346,899 | B1 | 2/2002 | Hadidi | | | | |
| 6,351,229 | B1 | 2/2002 | Wang | | | | |
| RE37,619 | E | 4/2002 | Mercer et al. | | | | |
| 6,369,734 | B2 | 4/2002 | Volk | | | | |

| | | | |
|---|---|---|---|
| 2004/0208312 | A1 | 10/2004 | Okuda |
| 2005/0025266 | A1 | 2/2005 | Chan |

FOREIGN PATENT DOCUMENTS

| | | |
|---|---|---|
| EP | 0 800 278 | 8/1997 |
| JP | 57-48827 | 3/1982 |
| JP | 58-111415 | 7/1983 |
| JP | 62-159925 | 7/1987 |
| JP | 63-300700 | 7/1988 |
| JP | 63-300700 | 12/1988 |
| JP | 204527 | 8/1989 |
| JP | 3-273704 | 12/1991 |
| JP | 4-293306 | 10/1992 |
| JP | 4-351109 | 12/1992 |
| JP | 05-064231 A | 3/1993 |
| JP | 06-029853 | 2/1994 |
| JP | 06-97831 | 4/1994 |
| JP | 6-276182 | 9/1994 |
| JP | 7-131260 | 5/1995 |
| JP | 09-55770 | 8/1995 |
| JP | 09-270707 | 3/1996 |
| JP | 10-126183 | 5/1998 |
| JP | 2001-177409 | 12/1999 |
| JP | 06-97831 | 4/2005 |
| JP | 09-270707 | 4/2005 |
| JP | 2001-177409 | 4/2005 |
| TW | 0497334 | 8/2002 |
| TW | 0512608 | 12/2002 |
| TW | 0545016 | 8/2003 |
| WO | WO 99/46867 | 9/1999 |
| WO | WO 00/27079 | 5/2000 |
| WO | WO 00/28663 | 5/2000 |
| WO | WO 00/28663 A2 | 5/2000 |
| WO | WO 00/28663 A3 | 5/2000 |
| WO | WO 00/28668 | 5/2000 |
| WO | WO 00/28691 | 5/2000 |
| WO | WO 00/28691 A2 | 5/2000 |
| WO | WO 00/28691 A3 | 5/2000 |
| WO | WO 00/28712 | 5/2000 |
| WO | WO 00/35094 | 6/2000 |

OTHER PUBLICATIONS

Gray, et al., Analysis and Design of Analog Integrated Circuits, pp. 270 & 274.
Gray et al., Analysis and Design of Analog Integrated Circuits, Fourth Edition, pp. 217-221.
Dally, et al., "Digital Systems Engineering", cover and pp. 390-391.
*H4000 Digital Ethernet Transceiver Technical Manual*, Distributed Systems, Chapter 3, pp. 3-1 to 3-11, copyright 1982 by Digital Equipment Corporation.
"Gigabit Ethernet 1000BASE-T Whitepaper", Gigabit Ethernet Alliance, copyright 1977.
The Electrical Engineering Handbook, Chapter 31, "D/A and A/D Converters", Richard C. Dorf, editor, CRC Press, 1993.
"Microelectronic Circuits," Third Edition, Sedra et al., Chapter 2: Operational Amplifiers, §2.4, pp. 61-63, 1991.
Kamran Azadet and Chris Nicole; Low-Power Equalizer Architectures for High-Speed Modems; Oct. 1998; pp. 118-126.
Dunning, Jim, "An All-Digital Phase-Locked Loop with 50-Cycle Lock Time Suitable for High-Performance Microprocessors," IEEE Journal of Solid-State Circuits, vol. 30, No. 4, Apr. 1995, pp. 412-422.
Moon, Yongsam, et al., "An All-Analog Multiphase Delay-Locked Loop Using a Replica Delay Line for Wide-Range Operation and Low-Jitter Performance," IEEE Journal of Solid-State Circuits, vol. 35, No. 3, Mar. 2000, pp. 377-384.
Wang, HongMo, "WP 23.8: A 9.8GHz Back-Gate Tuned VCO in 0.35 μm CMOS," ISSCC99, Session 23, Paper WP 23.8, 1999 IEEE International Solid-State Circuits Conference, pp. 406-407 & 484.
Rudell, et al., "SA 18.3: A 1.9 GHz Wide-Bank IF Double Conversion CMOS Integrated Receiver for Cordless Telephone Applications," 1997, pp. 304-305, 476.

Knight, Jr., T. "A Self-Terminating Low-Voltage Swing CMOS Output Driver," IEEE Journal of Solid-State Circuits, vol. 23, No. 2, Apr. 1988, pp. 457-464.
Niknejad, et al., "Analysis and Optimation of Monolithic Inductors and Transformers for RF ICs," IEEE 1997 Custom Integrated Circuits Conference, pp. 375-378.
U.S. Appl. No. 09/920,240, filed Aug. 1, 2001, Roo.
U.S. Appl. No. 09/737,743, filed Dec. 18, 2000, Sutardja.
Sedra et al., Microelectronic Circuits, Third Edition, 1991, pp. 48-115.
Lee, et al., "A CMOS Serial Link for Fully Duplexed Data Communication", Apr. 1995.
Song, et al., FP 12.1: NRZ Timing Recovery Technique for Band-Limited Channels (Slide Supplement), 1996.
Chien, "Delay Based Monolithic CMOS Frequency Synthesizer for Portable Wireless Applications", May 20, 1998.
Cho et al., "A Single-Chip CMOS Direct Conversion Transceiver for 900 MHz Spread-Spectrum Digital Cordless Telephones"; 1999.
Shoval et al.; "A CMOS Mixed-Signal 100Mb/s Receive Architecture for Fast Ethernet"; 1999.
Hester et al.; "CODEC for Echo-Canceling Full-Rate ADSL Modems"; Dec. 1999.
Nack, et al., "A Constand Slew Rate Ethernet Line Driver", May 2001.
Yee et al., An Integratable 1-2.5 Gbps Low Jitter CMOS Transceiver with Built in Self Test Capability, 1999.
Intersil, HC-5509B ITU CO/Loop Carrier SLIC, Aug. 2003.
Regan, ADSL Line Driver/Receiver Design Guide, Part 1, Feb. 2000.
Philips, The HC-5502X14X Telephone Subscriber Line Interface Circuits (SLIC), Jan. 1997.
Fuad Surial Atiya, et al., An Operational Amplifier Circulator Based on the Weighted Summer, Jun. 1975.
Narayanan et al., Doppler Estimation Using a Coherent Ultrawide-Band Random Noise Radar, Jun. 2000.
Stephens, Active Output Impedance for ADLS Line Drivers, Nov. 2002.
Azadet et al., A Gigabit Transceiver Chip Set for UTP CA-6 Cables in Digital CMOS Technology, Feb. 2000.
Baird et al., A Mixed Sample 120M s PRML Solution for DVD Systems, 1999.
Baker, An Adaptive Cable Equalizer for Serial Digital Rates to 400Mb/s, 1996.
Everitt et al., A 10/100Mb/s CMOS Ethernet Transceiver for 10BaseT, 10BaseTX and 100Base FX, 1998.
Walker et al., A Two Chip 1.5 GBd Serial Link Interface, Dec. 1992.
Lee, et al., A 3V 10b 100 MS/s Digital-to-Analog Converter for Cable Modem Applications, Aug. 28-30, 2000 pp. 203-205.
Rudell, et al., "SA 18.3: A 1.9 GHz Wide-band IF Double Conversion CMOS Integrated Receiver for Cordless Telephone Applications," 1997, pp. 304-305, 476.
Young, et al., Monolithic High-Performance three-Dimensional Coil Inductors for Wireless Communications, 1997.
Wu, et al., A low glitch 10-bit 75 MHz CMOS video D/A converter, Jan. 1995, pp. 68-72.
Johns, et al., "Integrated Circuits for Data Transmission Over Twisted Pair Channels", Mar. 1997, pp. 398-406.
"IEEE Standard 802.3: Part 3 Carrier Sense Multiple Access with Collision Detection (CSMA/CD) Access Method and Physical Detection", Mar. 8, 2002, pp. 1-1538.
Young, et al., "A Low-Noise RF Voltage-Controlled Oscillator Using On-Chip High-Q Three-Dimensional Coil Inductor and Micromachined Variable Capacitor", Jun. 8-11, 1998, pp. 128-131.
Young, et al., "A Micromachined Variable Capacitor for Monolithic Low-Noise VCOS", 1996, pp. 86-89.
Abidi, et al., "FA 7.2: The Future of CMOS Wireless Transceivers", Feb. 7, 1997, pp. 118-119, 440.
Eto, et al., "A 333 MHz, 20mW, 18ps Resolution Digital DLL Using Current-controlled Delay with Parallel Variables Resistor DAC (PVR-DAC)", Aug. 28-30, 2000, pp. 349-350.
Ivan Jorgensen, et al., "Design of a 10-bit 100 MSamples/s BiCMOS D/A Converter", 1996, pp. 730-733.
Henriques, et al., "A CMOS Steering-Current Multiplying Digital-to-Analog Converter", 1995, pp. 145-155.

Wikner, et al., "Modeling of CMOS Digital-to-Analog Converters for Telecommunication", May 1999, pp. 489-499.
Van der Plas, et al., "A 14-Bit Intrinsic Accuracy $Q^2$ Random Walk CMOS DAC", Dec. 1999, pp. 1708-1718.
Radke, et al., "A 14-Bit Current-Mode ΣΔ DAC Based Upon Rotated Data Weighted Averaging", Aug. 2000, pp. 1074-1084.
Shui, et al., "Mismatch Shaping for a Current-Mode Multibit Delta-Sigma DAC", Mar. 1999, pp. 331-338.
Hamasaki, et al., "A 3-V, 22-mV Multibit Current-Mode ΣΔ DAC with 100 dB Dynamic Range", Dec. 1996, pp. 1888-1894.
Tsutomu, Kamoto, "An 8-bit 2-ns Monolithic DAC", Feb. 1988.
Weaver, Jr., "A Third Method of Generation and Detection of Single-Sideband Signals," Dec. 1956, pp. 1703-1705.
Niknejad et al., "Analysis and Optimization of Monolithic Inductors and Transformers for RF ICs," 1997, pp. 375-378.
Niknejad et al., "Analysis, Design, and Optimization of Spiral Inductors and Transformers for Si RF IC's, " Oct. 1998, pp. 1470-1481.
American National Standard, "Fibre Distributed Data Interface (FDDI)—Token Ring Twisted Pair Layer Medium Dependent (TP-PMD)," Sep. 25, 1995.
Nguyen et al., "Si IC-Compatible Inductors and LC Passive Filters," Aug. 1990, pp. 1028-1031.
Gardner, "Charge-Pump Phase-Lock Loops," Nov. 1980, pp. 1849-1858.
Davies, "Digital Generation of Low-Frequency Sine Waves," Jun. 1969, pp. 97-105.
Abidi, "TP 11.1: Direct-Conversion Radio Transceivers for Digital Communications," 1995.
Dolle, "A Dynamic Line-Termination Circuit for Multireceiver Nets," Dec. 1993, pp. 1370-1373.
Su et al., "Experimental Results and Modeling Techiques for Substrate Noise in Mixed-Signal Integrated Circuits," Apr. 1993, pp. 420-430.
Gray et al., "Future Directions in Silicon ICs for RF Personal Communications," 1995, pp. 83-90.
Gabara, "On-Chip Terminating Registers for High Speed ECL-CMOS Interfaces," 1992, pp. 292-295.
Horowitz et al., "High-Speed Electrical Signaling: Overview and Limitations," 1998, pp. 12-24.
Efendovich et al., Multifrequency Zero-Jitter Delay-Locked Loop, Jan. 1994, 67-70.
Niknejad et al., Numerically Stable Green Function for Modeling and Analysis of Substrate Coupling in Integrated Circuits, Apr. 1998, 305-315.
Hajimiri et al., Phase Noise in Multi-Gigahertz CMOS Ring Ocillators, 1998, 49-52.
Kim et al., "A 30-MHz Hybrid Analog/Digital Clock Recovery Circuit in 2-μm CMOS," 1990, pp. 1385-1394.
Liu et al., "WP 23.7: A 6.5 GHz Monolithic CMOS Voltage-Controlled Oscillator," 1999, pp. 404-405, 484.
Wang et al., "WP 23.8: A 9.8 GHz Back-Gate Tuned VCO in 0.35 μm CMOS," pp. 406-407, 484.
Rofougaran et al., "SP 24.6: A 900 MHz CMOS LC-Oscillator with Quadrature Outputs," 1996.
Koullias et al., "TP 9.2: A 900 MHz Tranceiver Chip Set for Dual-Mode Cellular Radio Mobile Terminals," 1993, pp. 140-141, 278.
Dauphinee et al., "SP 23.7: A Balanced 1.5 GHz Voltage Controlled Oscillator with an Integrated LC Resonator," 1997, pp. 390-391, 491.
Banu et al., "A BiCMOS Double-Low-IF Receiver for GSM," 1997, pp. 521-524.
Chang et al., "A CMOS Channel-Select Filter for a Direct-Conversion Wireless Receiver," 1996, pp. 62-63.
Waizman, "FA 18.5: A Delay Line Loop for Frequency Synthesis of De-Skewed Clock," Feb. 18, 1994, pp. 298-299.
Kinget, "FP 14.7: A Fully Integrated 2.7V 0.35 μm CMOS VCO for 5 GHz Wireless Applications," Feb. 5, 1998.
Lee et al., "A Fully Integrated Low-Noise 1-GHz Frequency Synthesizer Design for Mobile Communication Application," May 1997, pp. 760-765.
Parker et al., "A Low-Noise 1.6-GHz CMOS PLL with On-Chip Loop Filter," 1997, pp. 407, 409-410.
Park et al., "A Low-Noise, 900-MHz VCO in 0.6 μm CMOS," May 1999, pp. 586-591.
Soyuer et al., "A Monolithic 2-3-Gb/s 100-mW Clock and Data Recovery Circuit in Silicon Bipolar Technology," Dec. 1993, pp. 1310-1313.
Hu et al., "A Monolithic 480 Mb/s Parallel AGC/Decision/Clock-Recovery Circuit in 1.2-μm CMOS," Dec. 1993, pp. 1314-1320.
Parameswaran et al., "A New Approach for the Fabrication of Micromechanical Structures," Dec. 6, 1998, pp. 289-307.
Knight, Jr. et al., A Self-Terminating Low-Voltage Swing CMOS Output Driver, 1988, 457-464.
Maneatis, Low-Jitter Process-Independent DLL and PLL Based on Self-Biased Techniques, Nov. 1996, 1723-1732.
Chang et al., Large Suspended Inductors on Silicon and Their Use in a 1-μm CMOS RF Amplifier, May 1993, 246-248.
Gharpurey et al., Modeling and Analysis of Substrate Coupling in Integrated Cicuits, Mar. 1996, 344-353.
Myson Technology, "MTD214—Ethernet Encoder/Decoder and 10BaseT Transceiver with Built-in Waveform Shaper," 1997, pp. 1-11.
Myson Technology, "MTD972 (Preliminary) 100BaseTX PCS/PMA," 1997, pp. 1-21.
Craninckx et al., "A 1.8-GHz Low-Phase-Noise CMOS VCO Using Optimized Hollow Spiral Inductors," 1997, pp. 736-744.
Craninckx et al., "A 1.8-GHz Low-Phase-Noise Voltage-Controlled Oscillator with Prescaler," 1995, pp. 1474-1482.
Hung et al., "A 1.24-GHz Monolithic CMOS VCO with Phase Noise of 137 dBc/Hz at a 3-MHz Offset," 1999, pp. 111-113.
Rudell et al., "A 1.9-GHz Wide-Band IF Double Conversion CMOS Receiver for Cordless Telephone Applications," 1997, pp. 2071-2088.
Razavi, "SP 23.6: A 1.8 GHz CMOS Voltage-Controlled Oscillator," 1997, pp. 388-389.
Dec et al., "MP 4.8: A 1.9 GHz Micromachine-Based Low-Phase-Noise CMOS VCO," 1999, pp. 80-81, 449.
Sato et al., "SP 21.2: A 1.9 GHz Single-Chip IF Transceiver for Digital Cordless Phones," Feb. 10, 1996.
Lee et al., "A 2.5 V CMOS Delay-Locked Loop for an 18 Mbit, 500 Megabytes/s DRAM," 1994, pp. 1491-1496.
Joo Leong Tham, et al., "A 2.7-V 900-MHz/1.9-GHz Dual-Band Transceiver IC for Digital Wireless Communication," 1999, pp. 286-291.
Lam et al., "WP 23.6: A 2.6 GHz/5.2 GHz CMOS Voltage-Controlled Oscillator," 1999, pp. 402-403, 484.
Marshall et al., "TA 8.7: A 2.7V GSM Transceiver ICs with On-Chip Filtering," 1995.
Rudell et al., Recent Developments in High Integration Multi-Standard CMOS Transceivers for Personal Communication Systems, 1998, 149-154.
Shoval et al., A 100 Mb/s BiCMOS Adaptive Pulse-Shaping Filter, Dec. 1995, 1692-1702.
Jansen et al., SP 23.8: Silicon Bipolar VCO Family for 1.1 to 2.2 GHz with Fully-Integrated Tank and Tuning Circuits, Feb. 8, 1997, 392-393 & 492.
Cho et al.; "A Single-Chip CMOS Direct Conversion Transceiver for 900 MHz Spread-Spectrum Digital Cordless Telephones"; 1999.
Liberali et al., "Progress in High-Speed and High-Resolution CMOS Data Converters", Sep. 12-14, 1995, pp. 19-28.
Sedra et al., "Micro-Electronic Circuits", 1982, pp. 95-97 and 243-247.
DP83220 CDL™ Twisted Pair FDDI Transceiver Device, Oct. 1992.
Miki et al., "An 80-MHz 8-bit CMOS D/A Converter", Dec. 1986, pp. 983-988.
Letham et al., "A high-performance CMOS 70-Mhzpalette/DAC", Dec 1987, pp. 1041-1047.
Nakamura et al., "A 10-b 70-MS/s CMOS D/A/ converter", Apr. 1991, pp. 637-642.
Takakura et al., "A 10 bit 89 MHz glitchless CMOS D/A/ converter", May 1991, pp. 26.5.1-26.5.4.
Fournier et al., "A 130-MHz 8-b CMOS video DAC for HDTV applications", Jul. 1991, pp. 1073-1077.
Reynolds, "A 320 MHz CMOS triple 8b DAC with on-chip PLL and hardware cursor", Feb. 1994, pp. 50-51.

Chin et al., "A 10-b 125 MHz CMOS digital-to-analog (DAC) with threshold-voltage compensated current sources", Nov. 1994, pp. 1374-1380.

Chan et al., A 100 Mb/s CMOS 100Base-T3 Fast Ethernet Transceiver for Category 3, 4, & 5 UTP, 1998.

Wang, et al., A 1.2 GHz programmable DLL-Based Frequency Multiplier for Wireless Applications, Dec. 2004.

Su et al., "A CMOS Oversampling D/A Converter with a Current-Mode Semidigital Reconstruction Filter", Dec. 1993, pp. 1224-1233.

Miki et al., "An 80-MHz 8-bit CMOS D/A Converter", Dec. 1986, pp. 983-988.

Letham et al., "A high-performance CMOS 70-Mhzpalette/DAC", Dec. 1987, pp. 1041-1047.

Takakura et al., "A10 bit 80 MHz glitchless CMOS D/A/ converter", May 1991, pp. 26.5.1-26.5.4.

Wu et al., A low glitch 10-bit 75-MHz CMOS video D/A converter, Jan. 1995, pp. 68-72.

Gray et al., "Analysis and Design of Analog Integrated Circuits, 1997.

Stephens, "Active Output Impedence for ASDL Line Drivers", Nov. 2002.

Hamasaki, et al., "A 3-V, 22-mV Multibit Current-Mode $\Sigma\Delta$ DAC with 100 dB Dynamic Range", Dec. 1996, pp. 1888-1894.

Song, et al., FP 12.1: NRZ Timing Recovery Technique for Band-Limited Channels, 1996.

Wang, et al., "A 1.2 GHz Programmable DLL-Based Frequency Multiplier for Wireless Applications", Dec. 2004.

Tsutomu Kamoto, "An 8-bit 2-ns Monolithic DAC", Feb. 1988.

Nack, et al., "A Constant Slew Rate Ethernet Line Driver", May 2001.

"IEEE Standard 802.3: Part 3 Carrier Sense Multiple Access with Collision Detection (CSMA/CD) Access Method and Physical Detection", Mar. 8, 2002, pp. 1-378.

Harald, et al., "Design of a 10-bit 100 MSamples/s BiCMOS D/A Converter", 1996, pp. 730-733.

Lee, et al., "A 3V 10b 100MS/s Digital-to-Analog Converter for Cable Modem Applications", Aug. 28-30, 2000, pp. 203-205.

Wilkner, et al., "Modeling of CMOS Digital-to-Analog Converters for Telecommunication", May 1999, pp. 489-499.

Radke, et al., "A 145-Bit Current-Mode $\Sigma\Delta$ DAC Based Upon Rotated Data Weighted Averaging", Aug. 2000, pp. 1074-1084.

Niknejad et al., "Analysis, Design, and Optimization of Spiral Inductors and Transformers for Si RF IC's", Oct. 1998, pp. 1470-1481.

Gabara, "On-Chip Terminating Registers for High Speed ECL-CMOS Interfaces," 1992, pp. 292-295.

Horowitz et al., "High-Speed Electrical Signaling: Overview and Limitations," 1998, pp. 12-24.

Koullias et al., "TP 9.2: A 900 MHz Transceiver Chip Set for Dual-Mode Cellular Radio Mobile Terminals," 1993, pp. 140-141, 278.

Kinget, "FP 14.7: A Fully Integrated 2.7V 0.35 μm CMOS VCO for 5 GHz Wireless Applications," Feb. 5, 1998.

Soyuer et al., "A Monolithic 2.3-Gb/s 100-mW Clock and Data Recovery Circuit in Silicon Bipolar Technology," Dec. 1993, pp. 1310-1313.

Cho et al., "TP 13.5: A Single-Chip CMOS Direct-Conversion Transceiver for 900 MHz Spread-Spectrum Digital Cordless Phones," 1999, pp. 228-229, 464.

Sedra et al., Microelectronic Circuits, Third Edition, 1991, pp. 86-92.

Moon et al., "An All Analog Multiphase Delay Locked Loop Using a Replica Delay Line for Wide Range Operation and Low-Jitter Performance," Mar. 2000, pp. 377-384.

I.E.E.E. Standard 802.3: Part 3, "Carrier Sense Multiple Access with Collision Detection (CSMA/CD) Access Method and Physical Detection," Mar. 8, 2002, pp. 1-378.

Myson Technology, "MTD214—Ethernet Encoder/Decoder and 10BaseT Transceiver with Built-in Waveform Shaper," 1997, pp. 1-11.

Craninckx et al., "A 1.8-GHz Low-Phase-Noise CMOS VCO Using Optimized Hollow Spiral Inductors," 1997, pp. 736-744.

Craninckx et al., "A 1.8-GHz Low-Phase-Noise CMOS VCO Using Optimized Hollow Spiral Inductors," 1995, pp. 1474-1482.

Rudell et al., "A 1.9-GHz Wide-Band IF Double Conversion CMOS Receiver for Cordless Telephone Applications," 1997, pp. 2071-2088.

Rudell et al., "SA 18.3: A 1.9 GHz Wide-band IF Double Conversion CMOS Integrated Receiver for Cordless Telephone Applications," 1997, pp. 304-305, 476.

Leong et al., "A 2.7-V 900-MHz/1.9-GHz Dual-Band Transceiver IC for Digital Wireless Communications," 1999, pp. 286-291.

Sedra et al., Microelectronic Circuits, 3rd ed., 1991.

Phillips, The HC-5502X14X Telephone Subscriber Line Interface Circuits (SLIC), Jan. 1997.

Fuad Et al., An Operational Amplifier Circulator Based on the Weighted Summer, Jun. 1975.

Everitt et al., A CMOS Transceiver for 10-Mb/s and 100-Mb/s Ethernet, Dec. 1998.

Baker, An Adaptive Cable Equilizer for Serial Digital Rates to 400Mb/s, 1996.

Chan et al., A 100 Mb/s CMOs 100Base-T4 Fast Ethernet Transceiver for Category 3, 4 & 5 UTP, 1998.

Mueller, Combining Echo Cancellation and Decision Feedback Equalization, Feb. 29, 1979.

Chang et al., Large Suspended Inductors on Silicon and Their Use in a 1-um CMOS RF Amplifier, May 1993, 246-248.

Young et al., Monolithic High-Performance three-Dimensional Coil Inductors for Wireless Communications, 1997.

Hajimiri et al., Phase Noise in Multi-Gigahertz CMOS Ring Oscillators, 1998, 49-52.

Falconer; "Echo Cancellation in Two Wire Full Duplex With Estimation of Far-End Data Components"; Aug. 13, 1985.

Gawargy; "Electronic Hybrid Circuit"; Oct. 31, 1989.

Hester et al.; "CODEC for Echo-Canceling Full-Rate ADSL Modems"; Dec. 1999.

U.S. Appl. No. 60/106,265, filed Oct. 30, 1998, Chan.

U.S. Appl. No. 60/107,105, filed Nov. 4, 1998, Chan.

U.S. Appl. No. 60/107,702, filed Nov. 9, 1998, Chan.

U.S. Appl. No. 60/108,001, filed Nov. 11, 1998, Chan.

Bertolaccini, Mario, et al., A Precision Baseline Offset and Drift Corrector for Low-Frequency Applications, IEEE Transactions on Instrumentation and Measurement, vol. IM-34, No. 3, Sep. 1985, pp. 405-412.

Everitt, James, et al., "A CMOS Transceiver for 10-Mb/s and 100-Mb/s Ethernet," IEEE Journal of Solid-State Circuits, vol. 33, No. 12, Dec. 1998, pp. 2169-2177.

Song, Bang-Sup, et al., "FP 12.1: NRZ Timing Recovery Technique for Band-Limited Channels," ISSCC 96/Session 12/Serial Data Communications/Paper FP 12.1, 1996 IEEE International Solid State Circuits Conference pp. 194-196.

Mueller, K.H., "Combining Echo Cancellation and Decision Feedback Equalization," The Bell System Technical Journal, vol. 58, No. 2, Feb. 1979, pp. 491-500.

Goldberg, Lee, "Gigabit Ethernet PHY Chip Sets LAN Speed Record for CopperStory," Tech Insights, Nov. 16, 1998.

Stonick et al; An Adaptive PAM-4 5-Gb/s Backplane Transceiver in 0.25 um CMOS; IEEE Journal of Solid-State Circuits, vol. 38, No. 3, Mar. 2003; pp. 436-443.

Rao, Sailesh; Short Course: Local Area Networks, International Solid State Circuits Conference; Sailesh Rao; Outline Implementing Gigabit Ethernet Over Cat-5 Twisted-Pair Cabling; Jack Kenny; Signal Processing and Detection in Gigabit Ethernet; Feb. 1999; 3 pages.

Techdictionary.com definition of decoder, Link: http://www.techdictionary.com; Dec. 2005; 1 page.

University of Pennsylvania CSE Digital Logic Lab re decoders. Link: http://www.cse,dmu.ac.uk/sexton/WWW/Pages/cs2.html; Dec. 2005; 3 pages.

Maneatis, John G.; FA 8.1: Low-Jitter Process-Independent DLL and PLL Based ob self-Biased Techniques; Nov. 1996; pp. 1723-1732.

Dehng et al; "A Fast-Lock Mixed-Mode DLL Using a 2-b SAR Algorithm"; IEEE Journal of Solid State Circuits, vol. 36, No. 10; Oct. 2001; pp. 1464-1471.

Razavi; "Principles of Data Conversion System Design"; Textbook IEEE Press; Jan. 1995; 139 pages.

Mano; "Digital Logic and Computer Design"; Prentice Hall; copyright Jan. 1979; 627 pgs.

Farjad-rad, et al; "4.5 A 0.2-2GHz 12mW Multiplying DLL for Low-Jitter Clock Synthesis in Highly Integrated Data Communication Chip"; 2002; 8 pgs. IEEE - ISSCC - Jan. 2000.

Gotoh et al; "All-Digital Multi-Phase Delay Locked Loop for Internal Timing Generation in Embedded and/or High-Speed DRAMS"; IEEE Symposium on VLSI Circuits, Feb. 1997.

Johnson et al; "THAM 11.2: A Variable Delay Line Phase Locked Loop for CPU-Coprocessor Synchronization"; IEEE Solid State Circuits Conf., Feb. 1988; pp. 142-143; 334-335.

Sonntag et al; "FAM: 11.5: A Monolithic CMOS 10MHz DPLL for Burse-Mode"; IEEE Solid State Circuits Conf.; Feb. 1990.

Garlepp et al; "A Portable Digital DLL Architecture for CMOS Interface Circuits", Feb. 1998 Symposium on VLSI Circuits, Digest of Technical Papers, pp. 214-215

Lin et al; "A Register-Controller Symmetrical DLL for Double-Data-Rate DRAM"; IEEE Journal Solid State Circuits; Apr. 1999; pp. 565-568.

Dehng et al; "Clock-Deskaw Buffer Using a SAR-Controlled Delay-Locked Loop"; IEEE Journal of Solid State Circuits; Nov. 2002; vol. 35, No. 8; pp. 1128-1136.

Kim et al; "A Low-Power Small-Area 7.28-ps-Jitter 1-GHz DLL-Based Clock Generator"; IEEE Journal of Solid state Circuits; Nov. 2002; vol. 37, No. 11; pp. 1414-1420.

Lin et al; "A 10-b, 500-Msample/s CMOS DAC in 0.6mm2"; IEEE; Dec. 1996; 11 pgs.

Gray et al; "Analysis and Design of Analog Integrated Circuits", Apr. 9, 2001; pp. 217-221.

Gray et al; "Analysis and Design of Analog Integrated Circuits", Apr. 9, 2001; pp. 270 and 274.

Dally et al; "Digital Systems Engineering"; Cambridge Univ. Press; Jun. 1998; cover and pp. 390-391.

Hellwarth et al; "Digital-to-analog Converter having Common-mode Isolation and Differentail Output"; IBM Journal of Research & Development; Jan. 1973.

Shoval et al; "WA 18.7 - A Combined 10/125 Mbaud Twisted-Pair Line Driver with Programmable Performance/Power Features"; IEEE Int'l. Solid State Circuit Conf. Feb. 2000; Solid State Circuits, IEEE Journal of, vol. 35, Issue 12, Nov. 2000; pp. 314-315.

Chien; "Monolithic CMOS Frequency Synthesizer for Cellular Applications"; Solid State Circuits. IEEE Journal of, vol. 35, Issue 12, Dec. 2000.

Chien; "Low-Noise Local Oscillator Design Techniques using DLL-based Frequency Multiplier for Wireless Application"; Dissertation; Univ. of Calif., Berkley; Spring 2000.

Song; "Dual Mode Transmitter with Adaptively Controlled Slew Rate and Impedance Supporting Wide Range Data Rates"; ASIC/SOC Conf., Sep. 9-12, 2001.

Heliums et al; "An ADSL Integrated Active Hybrid Circuit"; Aug. 7, 2002.

He et al; "A DSP Receiver for 1000 Base-T PHY"; IEEE Solid State Circuits Conf. 2001, Digest of Tech Papers; IEEE Journal of Solid State Circuits, Feb. 2001.

Roo et al; "A CMOS Transceiver Analog Front-end for Gigabit Ethernet over Cat-5 Cables"; Solid State Circuits Conf., Feb. 5, 2001, Digest of Technical Papers; Journal of IEEE Solid State Circuits, Feb. 2001.

Shoael et al; "A 3V Low Power 0.25μm CMOS 100Mb/s Receiver for Fast Ethernet"; May 6, 2001.

Chien et al; "TP 12.4: A 900-MHz Local Oscillator using a DLL-based Frequency Multiplier Technique for PCS Applications"; Journal of IEEE Solid State Circuits; Feb. 2000; pp. 202-203 and 458.

Van de Plassche; "Integrated Analog-to-Digital and Digital-to Analog Converters - Chapter 6"; Boston: Clower Academic Publisher; May 1994: pp. 211-271.

Milman et al; "Pulse, Digital, and Switching Waveforms"; Jun. 1965; pp. 674-675.

Weigandt et al; "Analysis of Timing Jitters in CMOS Ring Oscillators"; IEEE Symposium on Circuits and Systems; Amy 1994; pp. 27-30.

Dally et al; "High Performance Electrical Signaling"; Jun. 1998.

Munshi et al; "Adaptive Impedance Matching"; Dec. 1999; pp. 69-72.

Kim et al; "PLL/DLL System Noise Analysis for Low Jitter Clock Synthesizer Design"; 1994 IEEE Symposium on Circuits and Systems; May 1994; pp. 31-34.

Lin et al; "TP 12.5: A 1.4 Ghz Differential Low-Noise CMOS Frequency Synthesizer using a Wideband PLL Architecture"; Feb. 2000; pp. 204-205 and 458.

The Authoritative Dictionary of IEEE Standards terms, 7th Edition; Jul. 2000; p. 280.

Goldberg, Lee; "Gigabit Ethernet PHY Chip Sets LAN Speed record for CopperStory"; tech Insights; Nov. 16, 1998.

Kelly, N. Patrick et al; "WA 18.5 - A Mixed-Signal DFE/FFE receiver for 100Base-TX Applications", ISSCC 2000/Session 18/Wireline Communications/Paper WA 18.5, 2000 IEEE Int'l. Solid-State Circuits Conf., Feb. 7, 2000; pp. 310-311.

Linear Technology, "High Speed Modern Solutions", InfoCard 20, Linear Technology Corporation, Dec. 1994.

Linear Technology, LT1355/LT1356, Dual and Quad 12MHz, 400V/us OP Amps, Linear Technology Corporation, Dec. 1994, pp. 1-16.

Linear Technology, LT1358/LT1356, Dual and Quad 25MHz, 600V/us OP Amps, Linear Technology Corporation, Dec. 1994, pp. 1-12.

Linear Technology, LT1361/LT1362, Dual and Quad 50MHz, 800V/us OP Amps, Linear Technology Corporation, Dec. 1994, pp. 1-12.

Linear Technology, LT1364/LT1365, Dual and Quad 70MHz, 1000V/us OP Amps, Linear Technology Corporation, Dec. 1994, pp. 1-12.

Linear Technology, LT1813/LT1814, Dual and Quad 3mA, 100MHz, 750V/us OP Amps, Linear Technology Corporation, Dec. 1994, pp. 1-16.

Yamaguchi et al; "400Mbit/s Submarine Optical Repeater Using Integrated Circuits", Fujitsu Laboratories Ltd.; Jan. 1986 (and English Language Translation).

Uda et al; "125Mbit/s Fiber Optic Transmitter/Receiver with Duplex Connector", Fiber Otic Communications Development Div., NEC Corporation, NEC engineering, Ltd., Fiber and Integrated Optics, vol. 5, Issue 3; Jan. 1985 (and English Language Translation).

IEEE Standards 802.3ab-2002, "Part 3: Carrier sense multiple access with collision detection (CSMA/CD) access method and physical layer specifications"; Mar. 8, 2002; pp. 147-249.

Stonick et al; An Adaptive PAM-4 5-Gb/s backplane Transceiver in 0.25-um CMOS; IEEE Journal of Solid-State Circuits, vol. 38, No. 3, Mar. 2003; pp. 436-443.

* cited by examiner

US 7,433,665 B1

APPARATUS AND METHOD FOR CONVERTING SINGLE-ENDED SIGNALS TO A DIFFERENTIAL SIGNAL, AND TRANSCEIVER EMPLOYING SAME

The present application is a continuation-in-part of U.S. patent application Ser. No. 09/629,092 (now U.S. Pat. No. 6,775,529), filed Jul. 31, 2000.

The present application is related to the following commonly-assigned, applications: U.S. patent application Ser. No. 09/737,743, filed Dec. 18, 2000; and U.S. patent application Ser. No. 09/737,474 (now U.S. Pat. No. 6,462,688), filed Dec. 18, 2000.

INCORPORATION BY REFERENCE OF RELATED APPLICATIONS

The present application is related to U.S. patent application Ser. No. 09/629,092, entitled "Active Resistive Summer for a Transformer Hybrid," filed Jul. 31, 2000, and to U.S. patent application Ser. No. 09/920,240, entitled "Active Resistive Summer for a Transformer Hybrid," filed concurrently herewith, both of which name Pierte Roo (the inventor of the present invention) and Sehat Sutardja as inventors, and each of which is hereby incorporated herein by reference.

BACKGROUND

1. Field of the Invention

The present invention relates generally to communication circuitry, and, more particularly, to a method and apparatus for use in a communication circuit, such as an Ethernet or other network transceiver, for converting single-ended signals to a differential signal.

2. Related Art

In communication transceivers, and particularly in Ethernet transceivers which are capable of transmitting and receiving data at 1000 megabits bits per second, communication is possible in a full-duplex mode. In other words, transmitting and receiving of data can occur simultaneously on a single communication channel. Implementation of such a full-duplex communication channel results in a composite signal ($V_{TX}$) being present across the output terminals of the transceiver, the composite signal $V_{TX}$ having a differential transmission signal component and a differential receive signal component. In such a communication channel, the received signal ($V_{RCV}$) is derived by simply subtracting the transmitted signal ($V_T$) from the composite signal $V_{TX}$ that is present at the transceiver output terminals. Hence, $V_{RCV} = V_{TX} - V_T$.

This subtraction can be accomplished by generating a signal (referred to as a replica signal) which substantially replicates the transmitted signal, and canceling or subtracting the generated replica signal from the composite signal $V_{TX}$ at the output terminals of the transceiver. However, the replica signal is generated as two single-elided voltages, such as $V_{TXR+}$ and $V_{TXR-}$, whereas the composite signal present at the output terminals of the transceiver is a differential signal. Consequently, in order to cancel the replica signal from the composite signal to thereby obtain the received signal, the two single-ended voltage signals must first be converted to a differential signal that can then be subtracted from the composite signal. This conversion, however, requires additional circuitry which adds to the cost and complexity of the transceiver.

SUMMARY

The present invention relates to a method and apparatus for converting the single-ended voltage signals in an Ethernet transceiver into a differential voltage signal, so that the differential voltage signal can be subtracted from the composite signal to produce an accurate receive signal.

According to one aspect of the present invention, a communication circuit is provided for an Ethernet transceiver. The communication circuit preferably includes a first sub-circuit having a first input which receives a composite differential signal including first and second differential signal components, a second input which receives a differential replica transmission signal, and an output which provides a differential receive signal which comprise the composite differential signal minus the differential replica transmission signal. The communication circuit also may include a second sub-circuit which produces first and second single-ended replica transmission signals which together substantially comprise a replica of the first differential signal component of the composite differential signal and a third sub-circuit, which is coupled to the first and second sub-circuits, and which produces the differential replica transmission signal from the first and second single-ended replica transmission signals.

The communication circuit may further include a fourth sub-circuit which is coupled to the first sub-circuit and which produces a time-shift between the first differential signal component of the composite differential signal and the second differential signal component of the composite differential signal. The fourth sub-circuit may comprise a delay circuit which introduces a delay in the first differential signal component relative to the second differential signal component and, more particularly, may introduce a predetermined delay in the differential replica transmission signal relative to the first and second single-ended replica transmission signals from which the differential replica transmission signal is produced. The delay introduced by the fourth sub-circuit preferably substantially matches the predetermined delay introduced by the third sub-circuit. Also preferably, the first and second single-ended replica transmission signals are Class B signals, and the differential replica transmission signal is preferably produced from the first and second single-ended Class B replica transmission signals with a single operational amplifier.

According to another aspect of the invention, a communication circuit for an Ethernet transceiver includes: summing means having a first input for receiving a composite differential signal including first and second differential signal components, a second input for receiving a differential replica transmission signal, and an output for providing a differential receive signal which comprises the composite differential signal minus the differential replica transmission signal; replicating means for producing first and second single-ended replica transmission signals which together substantially comprise a replica of the first differential signal component of the composite differential signal; and converting means coupled to the summing means and the replicating means for producing the differential replica transmission signal from the first and second single-ended replica transmission signals.

According to yet another aspect of the present invention, in an Ethernet transceiver a composite differential signal including first and second differential signal components is received at a first input, a differential replica transmission signal is received at a second input, the composite differential signal and the differential replica transmission signal are combined to thereby provide at an output a differential receive signal which comprises the composite differential signal minus the differential replica transmission signal. The differential replica transmission signal is developed from first and second single-ended replica transmission signals, which together substantially comprise a replica of the first differential transmission signal component of the composite differential signal.

DETAILED DESCRIPTION

While the present invention will be described with respect to an Ethernet controller card for use in general purpose computers, printers, routers, etc, it is to be understood that the present invention may find applicability in other fields such as Internet communications, telecommunications, or any processor-to-processor applications using full-duplex communication. Also, rather than being embodied in discrete card, the method and apparatus of the present invention alternatively may advantageously be incorporated directly into a computer "mother board" or any other suitable hardware configuration, if desired.

Figure 1:
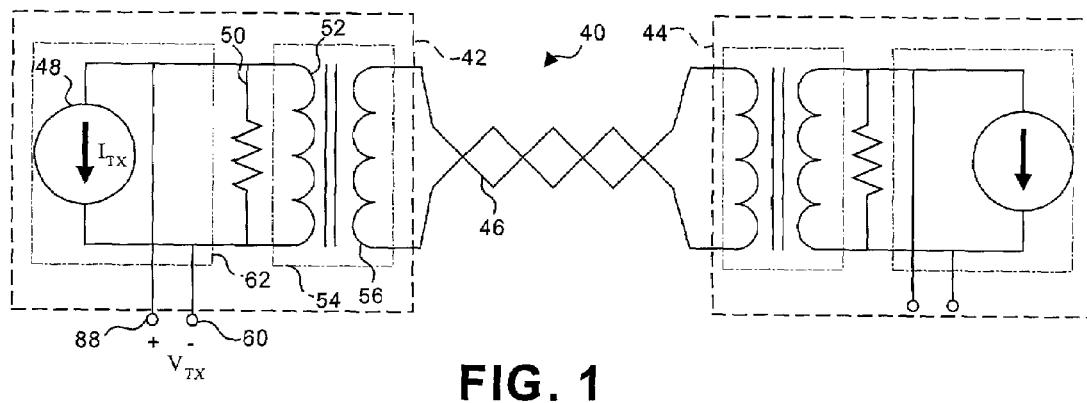
FIG. 1 is a high-level schematic diagram illustrating a communication channel in connection with which the method and apparatus of the present invention may be used.

Communication in an Ethernet computer network is illustrated in FIG. 1. As shown, an Ethernet communication channel 40 comprises a first Ethernet transceiver 42, a second Ethernet transceiver 44, and a two-wire interconnection 46 between the first Ethernet transceiver 42 and the second Ethernet transceiver 44. For example, the two-wire interconnection 46 may comprise a single twisted-pair of a Category 5 cable in accordance with IEEE gigabit transmission standard No. 802.3ab. As the Ethernet transceivers 42 and 44 may be substantially identical, only one of them is described herein.

The Ethernet transceiver 42 has a controlled current source 48, which is used to inject into the Ethernet transceiver 42 a control current $I_{TX}$, which corresponds to a signal to be transmitted from the Ethernet transceiver 42 to the Ethernet transceiver 44. Ethernet transceiver 42 also has a termination resistance 50 and a first coil 52 of a center-tap transformer 54. The center-tap transformer 54 also has a second coil 56 coupled to the two-wire interconnection 46 to provide signals transmitted by the first Ethernet transceiver 42 to the second Ethernet transceiver 44. The center-tap transformer 54 serves to couple AC voltage signals between the Ethernet transceivers 42 and 44 while effectively decoupling the Ethernet transceiver 42 from the Ethernet transceiver 44 with respect to DC voltage signals. A pair of terminals 58, 60 is provided to measure a voltage $V_{TX}$ present across the resistor 50 as a result of both signals transmitted by the Ethernet transceiver 42 and signals received by the Ethernet transceiver 42 from the Ethernet transceiver 44 via the two-wire interconnection 46. The voltage $V_{TX}$ thus comprises a composite differential signal that includes a differential transmission signal component and a differential receive signal component.

As described in more detail below, the differential receive signal component of the composite differential signal $V_{TX}$ is determined in accordance with the present invention by subtracting a replica of the differential transmission signal component from the composite differential signal $V_{TX}$. In the illustrated embodiment, the Ethernet transceiver 42 includes the termination resistance 50, the center-tap transformer 54, and an integrated circuit 62 containing communications circuitry for implementing the functionality of the Ethernet transceiver 42.

Figure 2:
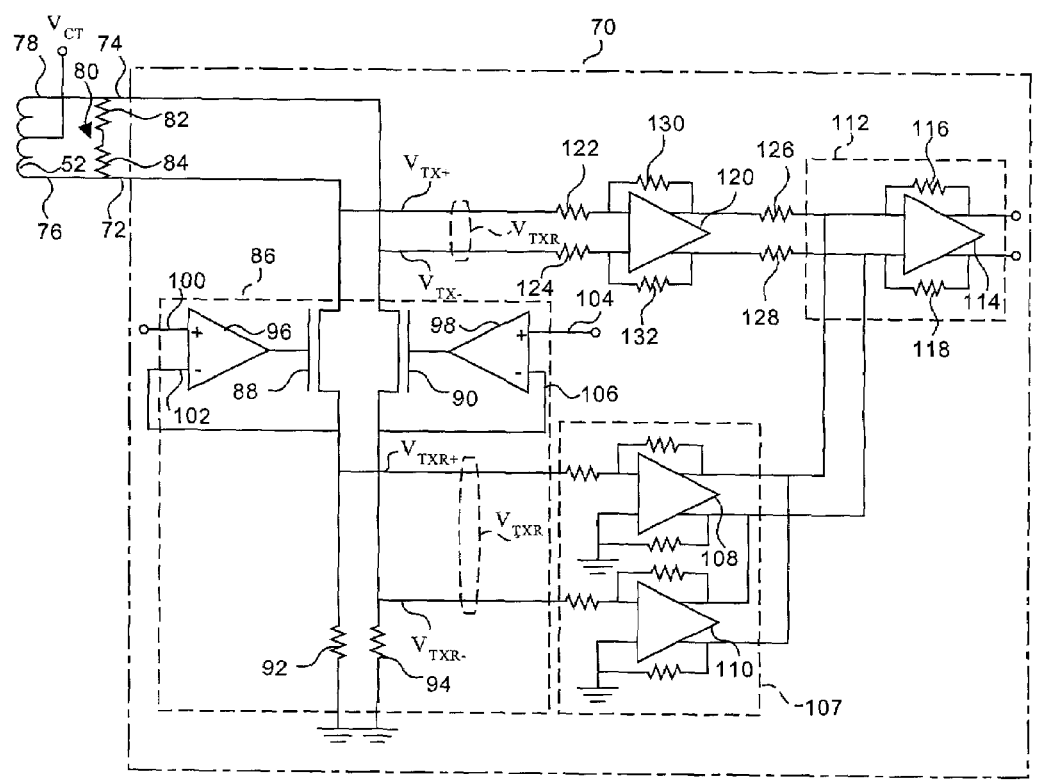
FIG. 2 is a detailed schematic diagram illustrating one embodiment of a transceiver according to the principles of the present invention.

An exemplary embodiment of such Ethernet transceiver communications circuitry is illustrated in the schematic of FIG. 2. As shown in FIG. 2, an integrated circuit 70 has a pair of output terminals 72, 74, which are coupled to terminals 76, 78, respectively, of the winding 52 of the center-tap transformer 54. Current in the winding 52 of the center-tap transformer 54 induces a proportional current in the secondary winding (not shown in FIG. 2) of the center-tap transformer 54, and that proportional current is communicated over the two-wire interconnection 46 (FIG. 1) to another Ethernet transceiver coupled thereto. Also coupled between the output terminals 72, 74 is a termination resistance 80, which, in the illustrated embodiment of FIG. 2, comprises a pair of termination resistors 82, 84. Preferably, the termination resistors 82, 84 have resistance values to substantially match the 1000 ohm characteristic impedance of Category 5 cable in accordance with established standards for Ethernet connections.

The integrated circuit 70 also includes a transmission signal replicator 86 or other suitable circuitry for generating first aid second single-ended replica transmission signals $V_{TXR+}$ and $V_{TXR-}$, which together substantially comprise a replica of the differential transmission component of the composite differential signal $V_{TX}$. In the illustrated embodiment, the transmission signal replicator 86 comprises a pair of metal-oxide semiconductor (MOS) transistors 88, 90.

The transistor 88 is coupled between the output terminal 72 and one end of a resistor 92, the other end of the resistor 92 being coupled to ground. Similarly, the transistor 90 is coupled between the output terminal 74 and one end of a resistor 94, the other end of which is coupled to ground. The gate of each transistor 88, 90 is coupled to and driven by the output of a respective operational amplifier 96, 98. The operational amplifier 96 has a non-inverting input 100 and an inverting input 102. The inverting input 102 of the operational amplifier 96 receives a feedback signal from the junction of the source of the transistor 88 and the resistor 92. Likewise, the operational amplifier 98 has a non-inverting input 104 and an inverting input 106, which receives a feedback signal from the junction of the source of the transistor 90 and the resistor 94.

A differential control voltage signal is applied between the non-inverting input 100 of the operational amplifier 96 and the non-inverting input 104 of the operational amplifier 98. This differential control voltage signal, when subjected to the voltage-to-current conversion brought about by the transmission signal replicator 86, provides the differential transmit signal component at the output terminals 72, 74. The feedback signal to the inverting input 102 of the operational amplifier 96 comprises a first single-ended replica transmit signal $V_{TXR+}$, and the feedback signal to the inverting input 106 of the operational amplifier 98 comprises a second replica transmit signal $V_{TXR-}$.

The single-ended replica transmit signals $V_{TXR+}$ and $V_{TXR-}$ are converted to a differential replica transmit signal by a converter circuit 107, which comprises respective differential operational amplifiers 108, 110, each provided with suitable input and feedback resistors, as shown in FIG. 2. The outputs of the differential operational amplifiers 108 and 110 are coupled to a differential active summer 112, which, in the embodiment of FIG. 2, comprises a differential operational amplifier 114 with feedback resistors 116, 118

Because the differential operational amplifiers 108 and 110 introduce a delay into the replica transmissions signals $V_{TXR+}$ and $V_{TXR-}$, the composite differential signal $V_{TX}$ is coupled to the differential active summer 112 through a further differential operational amplifier 120 arranged in a unity-gain configuration with input resistors 122, 124, output resistors 126, 128, and feedback resistors 130, 132. This unity-gain operational amplifier simply provides a delay in the composite differential signal $V_{TX}$ which preferably substantially matches the delay introduced in the replica transmission signals $V_{TXR+}$ and $V_{TXR-}$ by the operational amplifiers 108 and 110. As will be readily appreciated by those of ordinary skill in the art, the various input, output, and feedback resistance values associated with the operational amplifiers 108, 110, and 120 may be selected to ensure that these delays are substantially equal to one another.

Figure 3:
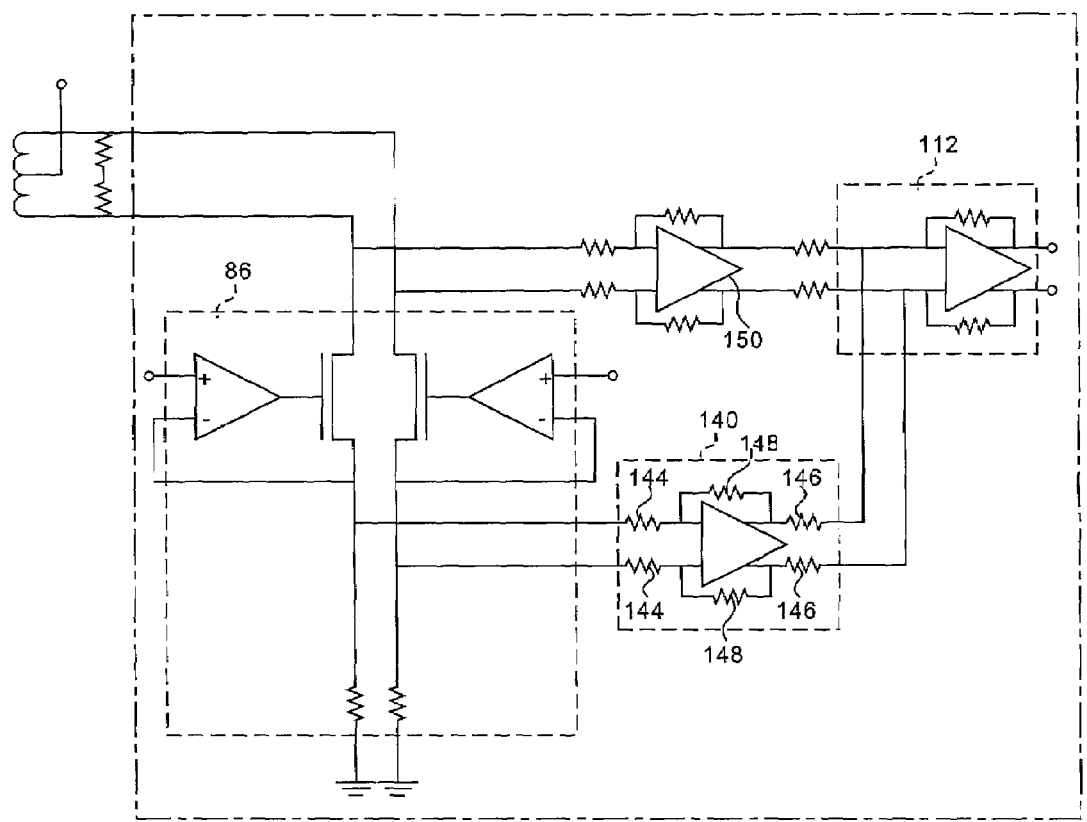
FIG. 3 is a detailed schematic diagram illustrating a second embodiment of a transceiver according to the principles of the present invention.

An alternative embodiment of a communications circuit in accordance with the present invention is shown in the schematic diagram of FIG. 3. Because the transmission signal replicator 86 and the differential active summer 112 in the embodiment of FIG. 3 are identical to those in the embodiment of FIG. 2, the details of those sub-circuits are omitted from the description of the embodiment of FIG. 3. The embodiment of FIG. 3, however, differs from the embodiment of FIG. 2 in the structure of the sub-circuit provided for converting the single-ended replica transmission signals $V_{TXR+}$ and $V_{TXR-}$ into a differential replica transmission signal $V_{TXR}$.

More particularly, as shown in FIG. 3, a converter circuit 140 is coupled to the transmission signal replicator 86 and to the differential active summer 112 to produce the differential replica transmission signal $V_{TXR}$ from the single-ended replica transmission signals $V_{TXR+}$ and $V_{TXR-}$. Just as in the embodiment of FIG. 2, the embodiment of FIG. 3 includes a unity-gain differential operational amplifier 150, which provides a delay in the differential composite signal $V_{TXR}$ to substantially match the delay introduced in the differential replica transmission signal $V_{TXR}$ by the converter circuit 140. As will be appreciated by those of ordinary skill in the art, the differential operational amplifier 150 is preferably provided with input, output, and feedback resistors having resistance values which give the differential operational amplifier 150 a unity-gain value. Accordingly, the differential active summer 112 receives as input the delayed differential composite signal $V_{TX}$ and the delayed differential replica transmission signal $V_{TXR}$ and subtracts the latter signal from the former to produce at an output of the differential active summer 112 a differential receive signal which comprises the composite differential signal minus the differential replica transmission signal aid thus corresponds to the signal received by the transceiver 70.

The simplification of the converter circuit 140 in the embodiment of FIG. 3, compared to the converter circuit 107 in the embodiment of FIG. 2, is made possible by the fact that the single-ended replica transmission signals $V_{TXR+}$ and $V_{TXR-}$ produced by the transmission signal replicator 86 in the illustrated embodiment are characterized by the feature that when $V_{TXR+}$ is asserted then $V_{TXR-}$ is zero (or ground), and when $V_{TXR-}$ is asserted then $V_{TXR+}$ is zero (or ground). It is because the single-ended replica transmission signals $V_{TXR+}$ and $V_{TXR-}$ have this characteristic that the two differential operational amplifiers 108 and 110 of the converter circuit 107 in the embodiment of FIG. 2 can be replaced by the single differential operational amplifier 142 in the converter circuit 140 of the embodiment of FIG. 3.

This reduction in components in the converter circuit 140 provides not only substantial simplification of the integrated circuit 70 as a whole, but it also reduces the well-recognized manufacturing problem of component mismatch, such as between the two differential operational amplifiers 109 and 110 of the embodiment of FIG. 2, for example, aid improves common-mode rejection, which, in turn, results in overall improved performance of the transceiver 42.

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. According, the exclusive use of all modifications within the scope of the appended claims is reserved.

What is claimed is:

1. A communication circuit for a network transceiver, comprising:

a first sub-circuit having a first input which receives a composite differential signal including first and second differential signal components, a second input which receives a differential replica transmission signal, and an output which provides a differential receive signal which comprises the composite differential signal minus the differential replica transmission signal;

a second sub-circuit which produces first and second single-ended replica transmission signals which together substantially comprise a replica of the first differential signal component of the composite differential signal, wherein when one of the first and second single-ended replica transmission signals is asserted, the other of the first and second single-ended replica transmission signals has a value of zero, wherein the second sub-circuit is configured to generate a current signal, wherein the first differential signal component of the composite differential signal comprises the current signal, wherein voltage signals are derived in accordance with the current signal, and wherein the first and second single-ended replica transmission signals comprise the voltage signals; and a third sub-circuit, which is coupled to the first and second sub-circuits, and which produces the differential replica transmission signal from the first and second single-ended replica transmission signals, wherein the third sub-circuit includes only a single differential operational amplifier.

2. The communication circuit of claim 1, further comprising a fourth sub circuit which is coupled to the first sub-circuit and which produces a time-shift between the first differential signal component of the composite differential signal and the second differential signal component of the composite differential signal.

3. The communication circuit of claim 2, wherein the fourth sub-circuit comprises a delay circuit which introduces a delay in the first differential signal component relative to the second differential signal component.

4. The communication circuit of claim 3, wherein the third sub-circuit introduces a predetermined delay in the differential replica transmission signal relative to the fast and second single-ended replica transmission signals from which the differential replica transmission signal is produced.

5. The communication circuit of claim 4, wherein the delay introduced by the fourth sub-circuit substantially matches the predetermined delay introduced by the third sub-circuit.

6. The communication circuit of claim 1, wherein the first and second single-ended replica transmission signals are Class B signals.

7. The communication circuit of claim 6, wherein the differential replica transmission signal is produced from the first and second single-ended Class B replica transmission signals with a single operational amplifier.

8. The communication circuit of claim 1, wherein the first sub-circuit is a summer which operates to subtract the differential replica transmission signal from the composite differential signal.

9. A communication circuit, comprising:
a summer having a first input which receives a composite differential signal including a differential transmission signal component and a differential receive signal component, a second input which receives a differential replica transmission signal, and an output which provides a differential receive signal which comprises the composite differential signal minus the differential replica transmission signal;
a transmission signal replicator which provides first and second single-ended replica transmission signals which together substantially comprise a replica of the differential transmission signal component of the composite differential signal, wherein when one of the first and second single-ended replica transmission signals is asserted, the other of the first and second single-ended replica transmission signals has a value of zero,
wherein the transmission signal replicator is configured to generate a current signal
wherein the differential transmission signal component of the composite differential signal comprises the current signal,
wherein voltage signals are derived in accordance with the current signal, and
wherein the first and second single-ended replica transmission signals comprise the voltage signals; and
a converter which converts the first and second single-ended replica transmission signals into the differential replica transmission signal, wherein the converter includes only a single differential operational amplifier.

10. The communication circuit of claim 9, further comprising a delay circuit which is coupled to the summer and which produces a time-shift between the differential transmission signal component of the composite differential signal and the differential receive signal component of the composite differential signal.

11. The communication circuit of claim 10, wherein the delay circuit introduces a delay in the differential transmission signal component relative to the differential receive signal component.

12. The communication circuit of claim 11, wherein the converter introduces a predetermined delay in the differential replica transmission signal relative to the first and second single-ended replica transmission signals from which the differential replica transmission signal is produced.

13. The communication circuit of claim 12, wherein the delay introduced by the delay circuit substantially matches the predetermined delay introduced by the converter.

14. The communication circuit of claim 9, wherein the differential transmission signal component, the differential receive signal component, and the differential replica transmission signal are Class B signals.

15. The communication circuit of claim 14, wherein the first and second single ended Class B replica transmission signals are converted to the differential replica transmission signal with a single operational amplifier.

16. The communication circuit of claim 9, wherein the summer is an active summer which operates to subtract the differential replica transmission signal from the composite differential signal.

17. A network controller, comprising:
a summing circuit that produces a differential receive signal as a difference between a composite differential signal and a differential replica transmission signal, the composite differential signal comprising a differential transmission signal component and a differential receive signal component;
a replica circuit which produces first and second single-ended replica transmission signals which together substantially replicate the differential transmission signal component of the composite differential signal, wherein when one of the first and second single-ended replica transmission signals is asserted, the other of the first and second single-ended replica transmission signals has a value of zero,
wherein the replica circuit is configured to generate a current signal,
wherein the differential transmission signal component of the composite differential signal comprises the current signal,
wherein voltage signals are derived in accordance with the current signal, and
wherein the first and second single-ended replica transmission signals comprise the voltage signals; and
a converter circuit which produces the differential replica transmission signal from the first and second single-ended replica transmission signals, wherein the converter circuit includes only a single differential operational amplifier.

18. The network controller of claim 17, further comprising a delay circuit which is coupled to the summing circuit and which produces a time-shift between the differential transmission signal component of the composite differential signal and the differential receive signal component of the composite differential signal.

19. The network controller of claim 18, wherein the delay circuit comprises a unity-gain operational amplifier which introduces a delay in the differential transmission signal component relative to the differential receive signal component.

20. The network controller of claim 19, wherein the converter introduces a predetermined delay in the differential replica transmission signal relative to the first and second single-ended replica transmission signals from which the differential replica transmission signal is produced.

21. The network controller of claim 20, wherein the delay introduced by the delay circuit substantially matches the predetermined delay introduced by the converter.

22. The network controller of claim 17, wherein the differential transmission signal component, the differential receive signal component, and the differential replica transmission signal are Class B signals.

23. The network controller of claim 22, wherein the differential replica transmission signal is produced from the first and second single-ended Class B replica transmission signals with a single operational amplifier.

24. The network controller of claim 17, wherein the summing circuit is an active summer which operates to subtract the differential replica transmission signal from the composite differential signal.

25. A communication circuit for a network transceiver, comprising:
summing means having a first input for receiving a composite differential signal including first and second differential signal components, a second input for receiving a differential replica transmission signal, and an output for providing a differential receive signal which comprises the composite differential signal minus the differential replica transmission signal;
replicating means for producing first and second single-ended replica transmission signals which together substantially comprise a replica of the first differential signal component of the composite differential signal, wherein when one of the first and second single-ended replica transmission signals is asserted, the other of the first and second single-ended replica transmission signals has a value of zero,
wherein the replicating means is configured to generate a current signal,
wherein the first differential signal component of the composite differential signal comprises the current signal,
wherein voltage signals are derived in accordance with the current signal, and
wherein the first and second single-ended replica transmission signals comprise the voltage signals; and
converting means coupled to the summing means and the replicating means for producing the differential replica transmission signal from the first and second single-ended replica transmission signals, wherein the converting means includes only a single differential operational amplifier.

26. The communication circuit of claim 25, further comprising a delaying means coupled to the summing means for producing a time-shift between the fast differential signal component of the composite differential signal and the second differential signal component of the composite differential signal.

27. The communication circuit of claim 26, wherein the delaying means comprises a delay circuit which introduces a delay in the first differential signal component relative to the second differential signal component.

28. The communication circuit of claim 27, wherein the converting means introduces a predetermined delay in the differential replica transmission signal relative to the first and second single-ended replica transmission signals from which the differential replica transmission signal is produced.

29. The communication circuit of claim 28, wherein the delay introduced by the delaying means substantially matches the predetermined delay introduced by the converting means.

30. The communication circuit of claim 25, wherein the first and second single-ended replica transmission signals are Class B signals.

31. The communication circuit of claim 30, wherein the differential replica transmission signal is produced from the first and second single-ended Class B replica transmission signals with a single operational amplifier.

32. The communication circuit of claim 25, wherein the summing means is a summer which operates to substantially cancel the differential replica transmission signal from the composite differential signal.

33. A communication circuit, comprising:
a summing means having a first input for receiving a composite differential signal including a differential transmission signal component and a differential receive signal component, a second input for receiving a differential replica transmission signal, and an output for providing a differential receive signal which comprises the composite differential signal minus the differential replica transmission signal;
a replicating means for providing first and second single-ended replica transmission signals which together substantially comprise a replica of the differential transmission signal component of the composite differential signal, wherein when one of the first and second single-ended replica transmission signals is asserted, the other of the first and second single-ended replica transmission signals has a value of zero,
wherein the replicating means is configured to generate a current signal,
wherein the differential transmission signal component of the composite differential signal comprises the current signal,
wherein voltage signals are derived in accordance with the current signal, and
wherein the first and second single-ended replica transmission signals comprise the voltage signals; and
a converting means for converting the first and second single-ended replica transmission signals into the differential replica transmission signal, wherein the converting means includes only a single differential operational amplifier.

34. The communication circuit of claim 33, further comprising a delaying means coupled to the summing means for producing a time-shift between the differential transmission signal component of the composite differential signal and the differential receive signal component of the composite differential signal.

35. The communication circuit of claim 34, wherein the delaying means introduces a delay in the differential transmission signal component relative to the differential receive signal component.

36. The communication circuit of claim 35, wherein the converting means introduces a predetermined delay in the differential replica transmission signal relative to the first and second single-ended replica transmission signals from which the differential replica transmission signal is produced.

37. The communication circuit of claim 36, wherein the delay introduced by the delaying means substantially matches the predetermined delay introduced by the converting means.

38. The communication circuit of claim 33, wherein the differential transmission signal component, the differential receive signal component, and the differential replica transmission signal are Class B signals.

39. The communication circuit of claim 38, wherein the first and second single-ended Class B replica transmission signals are converted into the differential replica transmission signal with a single operational amplifier.

40. The communication circuit of claim 33, wherein the summing means is an active resistive summer which operates to subtract the differential replica transmission signal from the composite differential signal.

41. A network controller, comprising:
summing means for producing a differential receive signal as a difference between a composite differential signal and a differential replica transmission signal, the composite differential signal comprising a differential transmission signal component and a differential receive signal component;
replicating means for producing first and second single-ended replica transmission signals which together substantially replicate the differential transmission signal component of the composite differential signal, wherein when one of the first and second single-ended replica transmission signals is asserted, the other of the first and second single-ended replica transmission signals has a value of zero,
    wherein the replicating means is configured to generate a current signal,
    wherein the differential transmission signal component of the composite differential signal comprises the current signal,
    wherein voltage signals are derived in accordance with the current signal, and
    wherein the first and second single-ended replica transmission signals comprise the voltage signals; and
combining means for producing the differential replica transmission signal from the first and second single-ended replica transmission signals, wherein the combining means includes only a single differential operational amplifier.

42. The network controller of claim 41, further comprising delaying means coupled to the summing means for producing a time-shift between the differential transmission signal component of the composite differential signal and the differential receive signal component of the composite differential signal.

43. The network controller of claim 42, wherein the delaying means comprises a unity-gain operational amplifier which introduces a delay in the differential transmission signal component relative to the differential receive signal component.

44. The network controller of claim 43, wherein the converting means introduces a predetermined delay in the differential replica transmission signal relative to the first and second single-ended replica transmission signals from which the differential replica transmission signal is produced.

45. The network controller of claim 44, wherein the delay introduced by the delaying means substantially matches the predetermined delay introduced by the converting means.

46. The network controller of claim 41, wherein the differential transmission signal component, the differential receive signal component, and the differential replica transmission signal are Class B signals.

47. The network controller of claim 46, wherein the differential replica transmission signal is produced from the first and second single-ended Class B replica transmission signals with a single operational amplifier.

48. The network controller of claim 41, wherein the summing means comprises an active summer for subtracting the differential replica transmission signal from the composite differential signal.

49. A communication method for a network transceiver, comprising:
    receiving a composite differential signal including first and second differential signal components at a first input;
    receiving a differential replica transmission signal at a second input;
    combining the composite differential signal and the differential replica transmission signal to thereby provide at an output a differential receive signal which comprises the composite differential signal minus the differential replica transmission signal;
    producing first and second single-ended replica transmission signals which together substantially comprise a replica of the first differential signal component of the composite differential signal, wherein when one of the first and second single-ended replica transmission signals is asserted, the other of the first and second single-ended replica transmission signals has a value of zero,
    wherein the step of producing further comprises the steps of:
        generating a current signal,
            wherein the first differential signal component of the composite differential signal comprises the current signal; and
        deriving voltage signals in accordance with the current signal
            wherein the first and second single-ended replica transmission signals comprise the voltage signals; and
    developing the differential replica transmission signal from the first and second single-ended replica transmission signals wherein the developing is performed with a single differential operational amplifier.

50. The communication method of claim 49, further comprising producing a time-shift between the first differential signal component of the composite differential signal and the second differential signal component of the composite differential signal.

51. The communication method of claim 50, wherein the time-shift is produced by a delay circuit which introduces a delay in the first differential signal component relative to the second differential signal component.

52. The communication method of claim 51, further comprising introducing a predetermined delay in the differential replica transmission signal relative to the first and second single-ended replica transmission signals from which the differential replica transmission signal is produced.

53. The communication method of claim 52, wherein the delay introduced in the first differential signal component substantially matches the predetermined delay introduced in the differential replica signal.

54. The communication method of claim 49, wherein the first and second single-ended replica transmission signals are Class B signals.

55. The communication method of claim 54, wherein the differential replica transmission signal is developed from the first and second single-ended Class B replica transmission signals with a single operational amplifier.

56. The communication method of claim 49, wherein combining the composite differential signal and the differential replica transmission signal comprises substantially canceling the differential replica transmission signal from the composite differential signal.

57. A communication method, comprising:
    receiving at a first input a composite differential signal including a differential transmission signal component and a differential receive signal component;
    receiving at a second input a differential replica transmission signal;
    providing at an output a differential receive signal which comprises the composite differential signal minus the differential replica transmission signal;
    providing first and second single-ended replica transmission signals which together substantially comprise a replica of the differential transmission signal component of the composite differential signal, wherein when one of the first and second single-ended replica transmission signals is asserted, the other of the first and second single-ended replica transmission signals has a value of zero, wherein the second step of providing further comprises
the steps of:
generating a current signal,
wherein the differential transmission signal component of the composite differential signal comprises the current signal; and
deriving voltage signals in accordance with the current signal
wherein the first and second single-ended replica transmission signals comprise the voltage signals; and
converting the first and second single-ended replica transmission signals into the differential replica transmission signal, wherein the converting is performed with a single differential operational amplifier.

58. The communication method of claim 57, further comprising producing a time-shift between the differential transmission signal component of the composite differential signal and the differential receive signal component of the composite differential signal.

59. The communication method of claim 58, wherein producing a time-shift between the differential transmission signal component and the differential receive signal component comprises introducing a delay in the differential transmission signal component relative to the differential receive signal component.

60. The communication method of claim 59, further comprising introducing a predetermined delay in the differential replica transmission signal relative to the first and second single-ended replica transmission signals from which the differential replica transmission signal is produced.

61. The communication method of claim 60, wherein the delay introduced in the differential transmission signal component substantially matches the predetermined delay introduced in the differential replica transmission signal.

62. The communication method of claim 57, wherein the first and second single-ended replica transmission signals are Class B signals.

63. The communication method of claim 62, wherein the differential replica transmission signal is developed from the first and second single-ended Class B replica transmission signals with a single operational amplifier.

64. The communication method of claim 57, wherein providing the differential receive signal comprises substantially canceling the differential replica transmission signal from the composite differential signal.

65. A network controller communication method, comprising:
producing a differential receive signal as a difference between a composite differential signal and a differential replica transmission signal, the composite differential signal comprising a differential transmission signal component and a differential receive signal component;
producing first and second single-ended replica transmission signals which together substantially replicate the differential transmission signal component of the composite differential signal, wherein when one of the first and second single-ended replica transmission signals is asserted, the other of the first and second single-ended replica transmission signals has a value of zero,
wherein the second step of producing further comprises the steps of:
generating a current signal,
wherein the differential transmission signal component of the composite differential signal comprises the current signal; and
deriving voltage signals in accordance with the current signal,
wherein the first and second single-ended replica transmission signals comprise the voltage signals; and
producing the differential replica transmission signal from the first and second single-ended replica transmission signals, wherein the producing is performed with a single differential operational amplifier.

66. The communication method of claim 65, further comprising producing a time shift between the differential transmission signal component of the composite differential signal and the differential receive signal component of the composite differential signal.

67. The communication method of claim 66, wherein the time-shift is produced by a unity-gain operational amplifier which introduces a delay in the differential transmission signal component relative to the differential receive signal component.

68. The communication method of claim 67, further comprising introducing a predetermined delay in the differential replica transmission signal relative to the first and second single-ended replica transmission signals from which the differential replica transmission signal is produced.

69. The communication method of claim 68, wherein the delay introduced in the differential transmission signal component substantially matches the predetermined delay introduced in the differential replica transmission signal.

70. The communication method of claim 65, wherein the fast and second single ended replica transmission signals are Class B signals.

71. The communication method of claim 70, wherein the differential replica transmission signal is developed from the first and second single-ended Class B replica transmission signals with a single operational amplifier.

72. The communication method of claim 65, wherein the summing means comprises an active summer for subtracting the differential replica transmission signal from the composite differential signal.

* * * * *

UNITED STATES PATENT AND TRADEMARK OFFICE
CERTIFICATE OF CORRECTION

PATENT NO. : 7,433,665 B1  
APPLICATION NO. : 09/920241  
DATED : October 7, 2008  
INVENTOR(S) : Pierte Roo Page 1 of 2

It is certified that error appears in the above-identified patent and that said Letters Patent is hereby corrected as shown below:

| | |
|---|---|
| Title Page 4, Column 1, Line 11 | Under "Foreign Patent Documents" delete duplicate reference "JP63-300700 – 12/1988" |
| Title Page 4, Column 2, Line 23 | Under "Other Publications" delete duplicate reference "Nack, et al." |
| Title Page 5, Column 1, Line 52 | Under "Other Publications" insert -- (1999) -- at the end of "Wang et al." reference |
| Title Page 6, Column 1, Line 16 | Under "Other Publications" delete duplicate reference "Wu et al." |
| Title Page 6, Column 1, Line 26 | Under "Other Publications" delete duplicate reference "Wang et al." |
| Title Page 6, Column 1, Line 28 | Under "Other Publications" delete duplicate reference "Tsutomu Kamoto" |
| Title Page 6, Column 1, Line 37 | Under "Other Publications" delete duplicate reference "Wilkner, et al." |
| Title Page 6, Column 1, Line 41 | Under "Other Publications" delete duplicate reference "Niknejad et al." |
| Title Page 6, Column 1, Line 43 | Under "Other Publications" delete duplicate reference "Gabara" |
| Title Page 6, Column 1, Line 45 | Under "Other Publications" delete duplicate reference "Horowitz et al." |
| Title Page 6, Column 1, Line 47 | Under "Other Publications" delete duplicate reference "Koullias et al." |
| Title Page 6, Column 1, Line 49 | Under "Other Publications" delete duplicate reference "Kinget" |
| Title Page 6, Column 1, Line 61 | Under "Other Publications" delete duplicate reference "I.E.E.E. Standard 802.3: Part 3..." |
| Title Page 6, Column 2, Line 13 | Under "Other Publications" delete "Equilizer" and insert -- Equalizer -- |
| Title Page 6, Column 2, Line 63 | Under "Other Publications" delete "ob" and insert -- on -- |
| Title Page 7, Column 2, Line 10 | Under "Other Publications" delete "Amy" and insert -- May -- |

Signed and Sealed this

Thirteenth Day of July, 2010

David J. Kappos  
*Director of the United States Patent and Trademark Office*

CERTIFICATE OF CORRECTION (continued)
U.S. Pat. No. 7,433,665 B1

| | |
|---|---|
| Title Page 7, Column 2, Line 33 | Under "Other Publications" "Linear Technology" reference, delete "1356" and insert -- 1359 -- |
| Title Page 7, Column 2, Line 53 | Under "Other Publications" delete duplicate reference "Stonick et al." |
| Column 1, Line 58 | Delete "single-elided" and insert -- single-ended -- |
| Column 4, Line 21 | Delete "1000" and insert -- 100 -- |
| Column 4, Line 26 | Delete "aid" and insert -- and -- |
| Column 5, Line 36 | Delete "$V_{TXR}$" and insert -- $V_{TX}$ -- |
| Column 6, Line 4 | Delete "aid" and insert -- and -- |
| Column 6, Line 62 | Delete "fast" and insert -- first -- |
| Column 9, Line 31 | Delete "fast" and insert -- first -- |
| Column 14, Line 43 | Delete "fast" and insert -- first -- |